United States Patent
Cui

(10) Patent No.: US 6,633,687 B1
(45) Date of Patent: Oct. 14, 2003

(54) METHOD AND APPARATUS FOR IMAGE CONTRAST MODULATION

(75) Inventor: Ying Cui, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/394,293

(22) Filed: Sep. 10, 1999

(51) Int. Cl.[7] ................................................. G06K 9/32
(52) U.S. Cl. ...................................... 382/298; 382/274
(58) Field of Search ................................. 382/298, 274, 382/299, 300, 176; 358/528, 451, 464, 1.2; 345/426, 214, 619, 621

(56) References Cited

U.S. PATENT DOCUMENTS

| | | | |
|---|---|---|---|
| 4,156,238 A | 5/1979 | Glasson et al. | 340/749 |
| 4,233,601 A | 11/1980 | Hankins et al. | 340/703 |
| 4,385,293 A | 5/1983 | Wisnieff | 340/793 |
| 4,695,884 A | 9/1987 | Anastassiou et al. | 358/163 |
| 4,703,318 A | 10/1987 | Haggerty | 346/723 |
| 4,706,077 A | 11/1987 | Roberts et al. | 340/728 |
| 4,716,405 A | 12/1987 | Yamaguchi | 340/743 |
| 4,739,313 A | 4/1988 | Oudshoorn et al. | 340/703 |
| 4,746,979 A | 5/1988 | Kashigi | 358/134 |
| 4,849,747 A | 7/1989 | Ogawa et al. | 340/735 |
| 4,924,413 A | 5/1990 | Suwannukul | 364/521 |
| 4,956,638 A | 9/1990 | Larky et al. | 340/701 |
| 4,977,398 A | 12/1990 | Pleva et al. | 340/793 |
| 4,992,862 A | 2/1991 | Gabor | 358/76 |
| 5,111,194 A | 5/1992 | Oneda | 340/793 |
| 5,113,455 A | 5/1992 | Scott | 382/47 |
| 5,400,053 A | 3/1995 | Johary et al. | 345/147 |
| 5,872,864 A | 2/1999 | Imade et al. | 382/176 |
| 5,874,937 A | 2/1999 | Kesatoshi | 345/127 |
| 6,141,061 A | 10/2000 | Takeuchi | 348/581 |

*Primary Examiner*—Yon J. Couso
(74) *Attorney, Agent, or Firm*—Thelen Reid & Priest LLP; John P. Schaub

(57) ABSTRACT

An apparatus for image contrast modulation includes a memory for storing a scaling factor and a memory for storing a pixel position. A pixel determiner calculates the position of another pixel based upon the pixel position and the scaling factor. A segment determiner ascertains which segment of the segmented line contains the pixel position. A coefficient generator determines which coefficient is associated with the line segment. A method for image contrast modulation includes defining at least one multi-segmented line that approximates a higher order curve including more than one pixel in a source image, and line-fitting pixel intensity values in a scaled image according to a multi-segmented line.

38 Claims, 9 Drawing Sheets

METHOD AND APPARATUS FOR IMAGE CONTRAST MODULATION

BACKGROUND OF THE INVENTION

1. Field Of The Invention

The present invention relates to image processing. More particularly, the present invention relates to a method and apparatus for image contrast modulation by interpolation with segmented lines.

2. Background

Typically, video data must be scaled during video processing because the source image size may differ from the display size. An image is "stretched" when pixels are added to a source image having a lower resolution to create a second image having a higher resolution. Pixels added to the second image must be assigned an intensity value. The intensity values may be grayscales or color component values. Preferably, the intensity values for the pixels added to the stretched image are selected such that the contrast properties of the source image are preserved, without introducing artifacts.

The simplest form of image stretching is pixel duplication or nearest neighbor, where a pixel from the source image is copied to the new image. For example, a 1:2 stretching of an image results in a new image which contains two copies of every pixel in the source image. Similarly, a 1:1.5 stretching of an image results in a new image which contains two copies of one out of every two pixels in the source image. The copied pixels have the same intensity values. This technique requires minimal hardware to implement, but it results in relatively poor image quality. The poor image quality includes the introduction of stair-stepping, false colors, missing edges and other artifacts.

An improvement in video quality of scaled images is possible using linear interpolation. Bilinear interpolation combines the linear interpolation process in both the horizontal and vertical directions. When an output sample falls between two input samples (horizontally or vertically), the output sample is computed by linearly interpolating between the two input samples.

Other approaches for determining intensity values in scaled images include using higher order interpolation. Generally, the higher the order of the interpolation, n, the better the overall quality of the resultant image. For the purposes of this disclosure, the term higher order interpolation refers to second or higher order polynomial curve fitting. Higher order interpolation requires significantly more hardware and memory bandwidth than pixel duplication or linear interpolation. The hardware typically required to implement such prior art techniques is shown in Table 1 below.

TABLE 1

| Method | Order | Hardware Cost - # of Line Buffers | Quality |
| --- | --- | --- | --- |
| Duplicate Pixels | Zero | 0–1 | Low |
| Linear Interpolation | First | 1–2 | Low-Medium |
| Bell Shape | Second | 2–3 | Medium |
| Cubic B-spline | Third | 3–4 | Medium-High |
| Polynomial | Higher | >=4 | High |

The pixel duplication and nearest neighbor methods require a minimum amount of hardware, but yield relatively low quality images. Linear interpolation requires additional hardware and yields better quality images, but data is still blurred and the high frequency content of images is not adequately preserved. Nth order interpolation yields significantly better images and preserves a broader range of frequency content, but requires much more hardware. The additional hardware required includes more multipliers and more line buffers to hold lines of pixel data. Higher order interpolations are performed over larger pixel areas, requiring a corresponding increase in the number of buffers that hold the data.

A reduction in the number of line buffers is made possible by performing interpolation on the fly or by using specialized frame buffer interfaces which provide blocks of pixel data rather than lines of pixel data. However, these approaches significantly complicate the design and require many more multipliers in hardware.

A need exists in the prior art for a method and apparatus for scaled image contrast modulation that adequately approximates higher order curves with minimal hardware.

BRIEF DESCRIPTION OF THE INVENTION

An apparatus for image contrast modulation includes a memory for storing a scaling factor and a memory for storing a pixel position. A pixel determiner calculates the position of another pixel based upon the pixel position and the scaling factor. A segment determiner ascertains which segment of the segmented line contains the pixel position. A coefficient generator determines which coefficient is associated with the line segment. A method for image contrast modulation includes defining at least one multi-segmented line that approximates a higher order curve including more than one pixel in a source image, and line-fitting pixel intensity values in a scaled image according to a multi-segmented line.

DETAILED DESCRIPTION OF THE PREFERRED EMBODIMENTS

Those of ordinary skill in the art will realize that the following description of the present invention is illustrative only. Other embodiments of the invention will readily suggest themselves to such skilled persons having the benefit of this disclosure.

This invention relates to image processing. More particularly, the present invention relates to a method and apparatus for image contrast modulation by interpolation with segmented lines. The invention further relates to machine readable media on which are stored (1) the layout parameters of the present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

According to the present invention, the intensity values for pixels in a scaled image are interpolated to fit a multi-segmented line between multiple pixels from a source image. The multi-segmented line is shaped to preserve the contrast properties of the source image, or to change the contrast properties of the source image.

The present invention achieves significant cost savings by providing contrast modulation approximating high order interpolation, but without the additional hardware required in typical high order interpolation systems. This cost savings is achieved in part by a reduced line buffer requirement. The present invention requires the same number of line buffers as linear interpolation because the same number of pixels from the source image is used to interpolate a new pixel intensity value. However, rather than perform linear interpolation between two points from the source image, the present invention divides the same distance into multiple smaller lines which better approximate a higher order curve. Linear interpolation is performed using one of the smaller lines.

Figure 1:
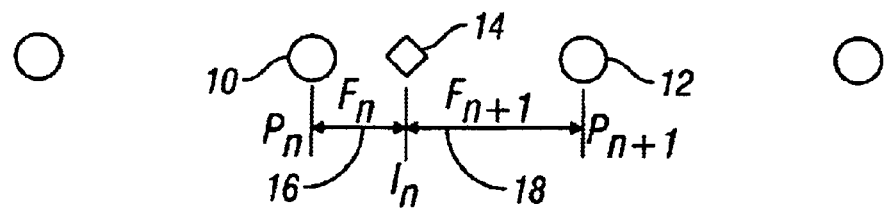
FIG. 1 is a diagram which illustrates linear interpolation in the horizontal direction.

Referring now to FIG. 1, linear interpolation in the horizontal direction is illustrated. Pixels from the source image are represented by $P_n$ (10) and $P_{n+1}$ (12). New pixel $I_n$ (14) falls between $P_n$ (10) and $P_{n+1}$ (12). The intensity value for a new pixel $I_n$ (14) is calculated using the following equation:

$$I_n = (F_n * P_n) + (F_{n+1} * P_{n+1})(F_n + F_{n+1} = 1)$$

where $F_n$ (16) and $F_{n+1}$ (18) weight factors for neighboring pixels $P_n$ (10) and $P_{n+1}$ (12) of the new pixel $I_n$ (14). The weight factors are calculated from the distance from $I_n$ (14) to the neighboring pixel. However, this technique results in blurry regions around high contrast areas.

Figure 2:
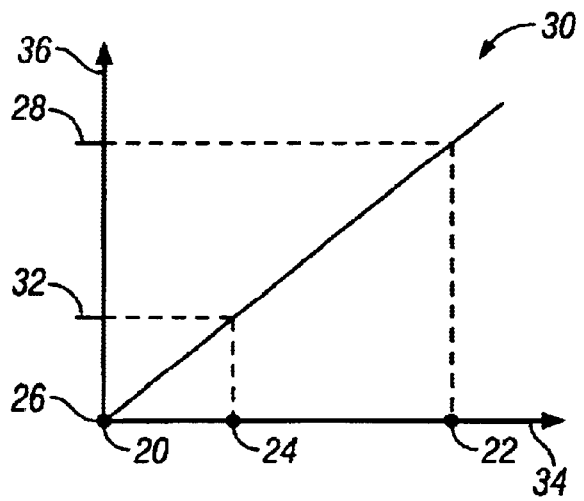
FIG. 2 is a diagram which graphically illustrates linear interpolation of pixel intensity values.

Referring now to FIG. 2, linear interpolation of pixel intensity values is illustrated graphically. The x-axis 34 represents two pixels in the source image, pixel 20 and pixel 22, and a new pixel 24 in the scaled image that falls between pixel 20 and pixel 22. The y-axis 36 represents pixel intensity. Pixel 20 has an intensity represented by reference numeral 26, and pixel 22 has an intensity represented by reference numeral 28. Line 30 connects intensity 26 with intensity 28. Applying linear interpolation, new pixel 24 will have an intensity represented by reference numeral 32 on line 30.

A text image is an example of an image having high contrast properties. The contrast is high because text is typically represented using only two colors: The foreground, which consists of the letters, and the background. Distinguishing between the foreground and the background requires a clear transition between the two areas. Image stretching using linear interpolation results in blurry text images because the resultant image contains image data with colors somewhere between that of the background color and the foreground color. This effect is exacerbated at higher scales.

Figure 3:
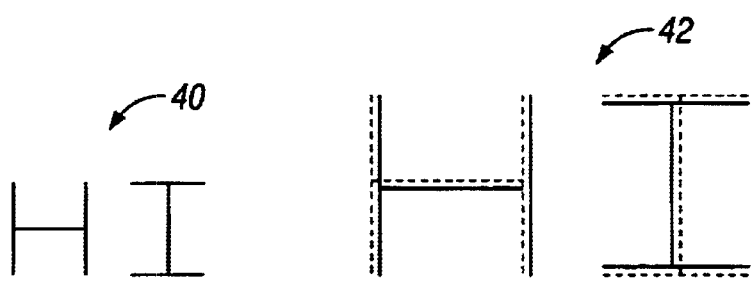
FIG. 3 is a diagram which illustrates text image stretching techniques.
Figure 3:
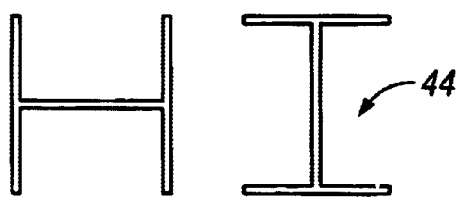

Referring now to FIG. 3, the effect of text image stretching using linear interpolation is illustrated. The source image is shown at reference numeral 40. The image stretched using linear interpolation is shown at reference numeral 42. The stretched image 42 is noticeably blurry. The desired result is illustrated at reference numeral 44. Note how the high frequency characteristics of the source text image 40 are maintained in the desired image 44.

Figure 4:
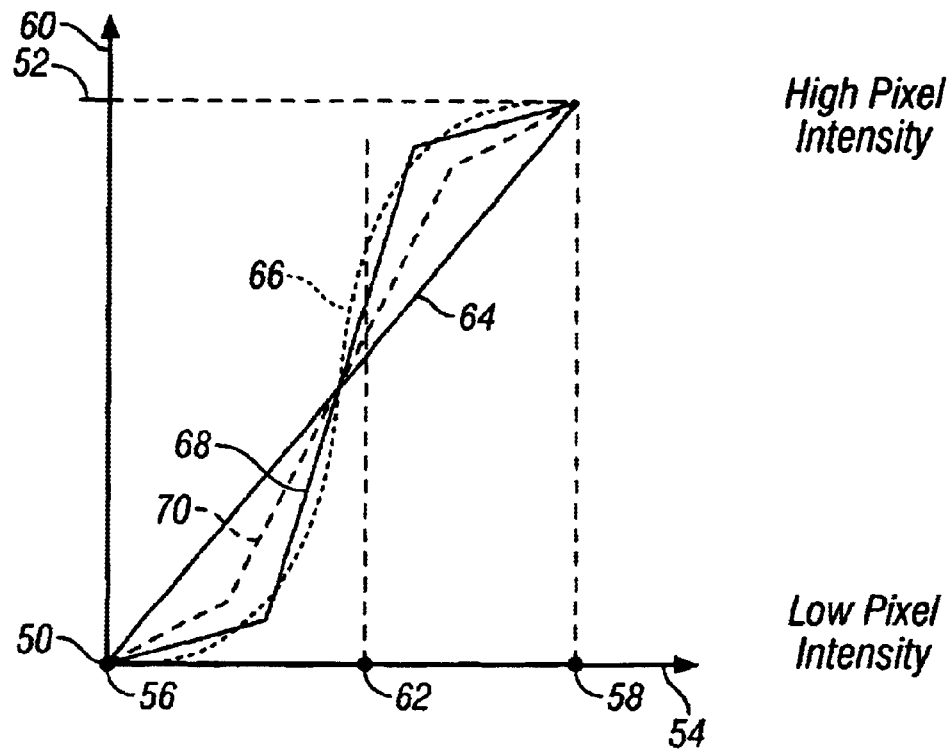
FIG. 4 is a diagram which illustrates image contrast modulation using three-segment lines, in accordance with one embodiment of the present invention.

Turning now to FIG. 4, interpolation in the horizontal direction using multi-segmented lines according to the present invention is illustrated. The intensity values of pixels from a source image are represented by first pixel intensity 50 and second pixel intensity 52. Both pixels are horizontally adjacent in the source image. The x-component 54 indicates the distance between first pixel 56 and second pixel 58, and the y-component 60 represents the intensity value. First pixel intensity 50 is lower than second pixel intensity 52. Reference numeral 62 represents the x-component of a pixel in a second image, which is a scaled image of the source image. Linear interpolation of the intensity value results in the intensity value represented by reference numeral 64.

Referring still to FIG. 4, curved line 66 represents an ideal fitting curve for a new line between the first pixel intensity 50 and the second pixel intensity 52. Solid line 68 and dashed line 70 are symmetric three-segment approximations to the curved line 66. Solid line 68 has a steeper slope. The steeper slope makes the solid line 68 better suited for high contrast preservation by minimizing the number of intermediate intensity values. Dashed line 70 has a more gradual slope, making it better suited for more moderate contrast preservation.

Figure 5:
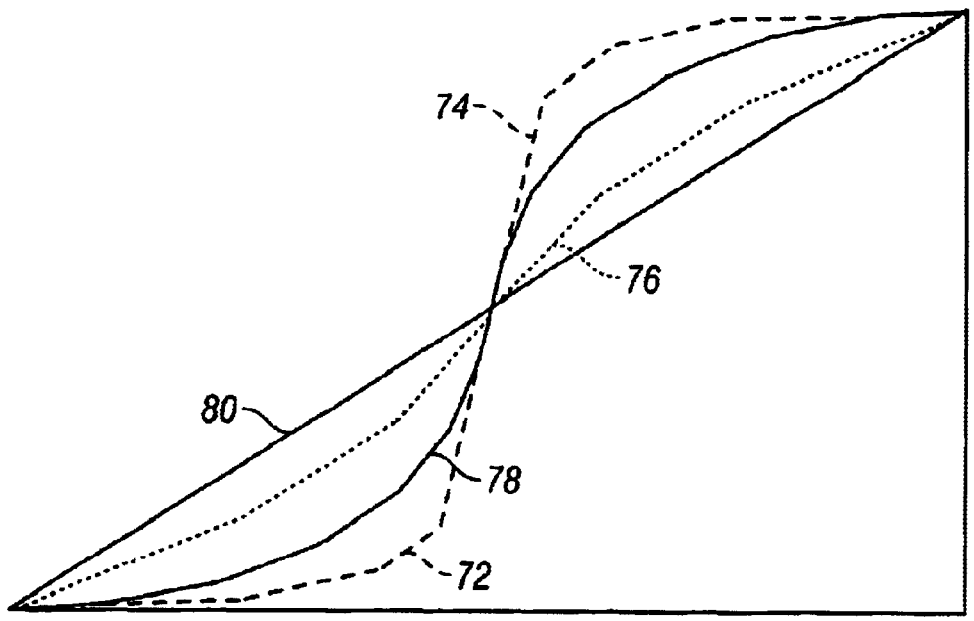
FIG. 5 is a diagram which illustrates image contrast modulation using five, seven and thirteen-segment lines, in accordance with embodiments of the present invention.

Referring now to FIG. 5, more symmetric multi-segmented lines are illustrated. Dashed line 72 is a seven-segment line. As noted above, the steep slope in the middle segment 74 makes the dashed line 72 better suited for high contrast modulation. Dotted line 76 is a five-segment line. Its gradual slope makes it better suited for low contrast modulation. Solid line 78 is a thirteen-segment line. Its moderate slope makes it better suited for moderate contrast modulation. The higher number of line segments allows better approximations of a high order curve.

The description of contrast modulation using symmetric multi-segmented lines is not intended to be limiting in any way. Those of ordinary skill in the art will recognize that asymmetric multi-segmented lines may be used as well, depending upon the contrast characteristics of the source image, and the desired characteristics of the scaled image.

Moreover, the number of line segments and the slope of each line segment may be varied as well.

Figure 6:
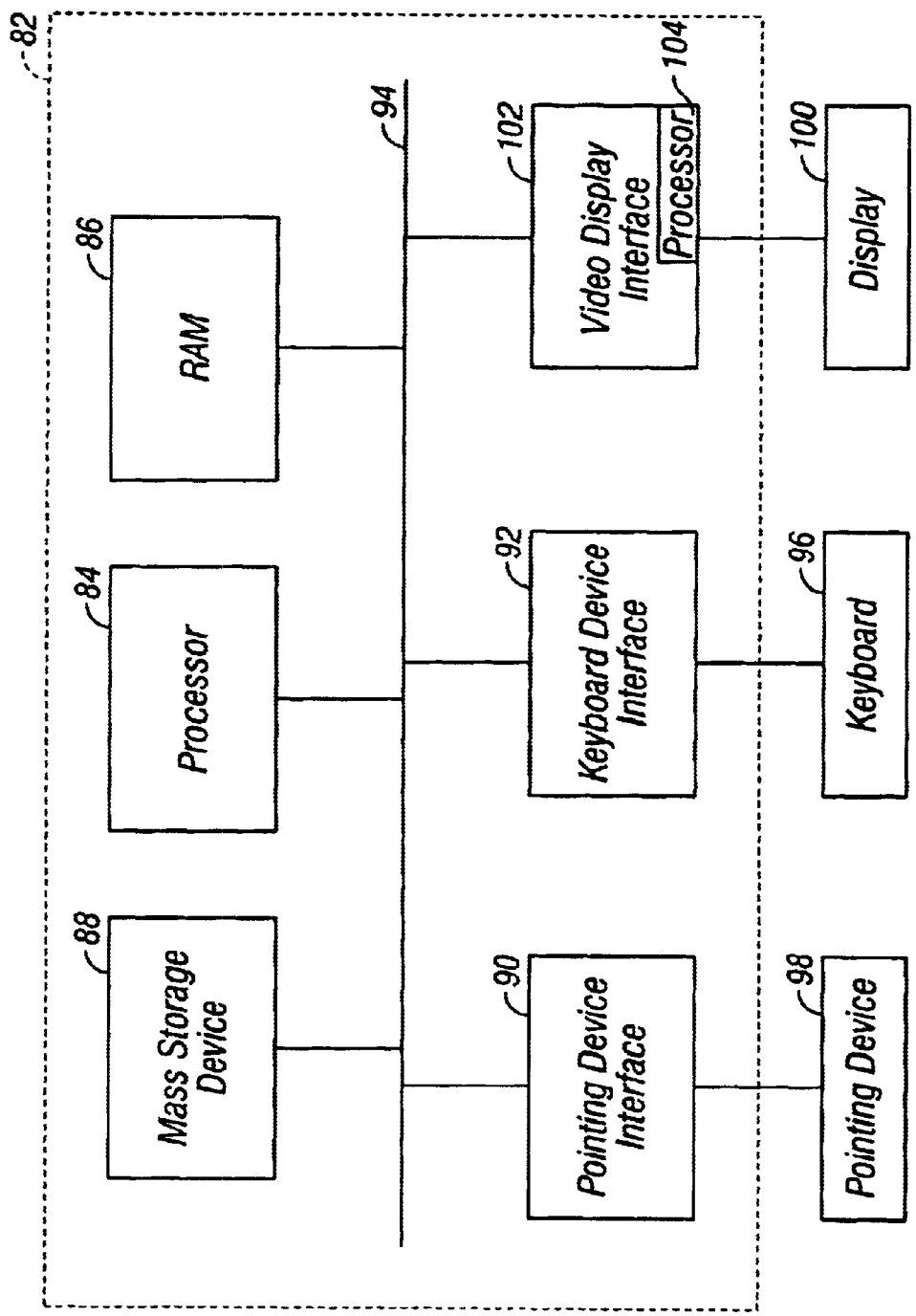
FIG. 6 is a block diagram which illustrates a computer system according to one embodiment of the present invention.

Turning now to FIG. 6, a block diagram showing a computer system according to one embodiment of the present invention is illustrated. The computer system comprises a core unit 82, including a first processor 84, a random access memory (RAM) 86, a mass storage device 88, a pointing device interface 90 and a keyboard device interface 92, all connected via a bus 94. A keyboard 96 is connected to the core unit 82 via the keyboard device interface 92. A pointing device 98 is connected to the core unit 82 via the pointing device interface 90. The core unit 82 is also connected to a display device 100 via a video display interface 102.

In operation, the first processor 84 processes program instructions stored in RAM 86 and mass storage device 88. The pointing device interface 90 and the keyboard device interface 92 allow manually entered data via the pointing device 98 and the keyboard 96, respectively. The video display interface 102 accepts digital video data from the first processor 84. The video display interface 102 contains a second processor 104. The video display interface 102 puts the digital video data in a format acceptable to the display device 100. This may include scaling the video data, in which case the contrast of the scaled image is modulated via interpolation using a multi-segmented line.

Figure 7:
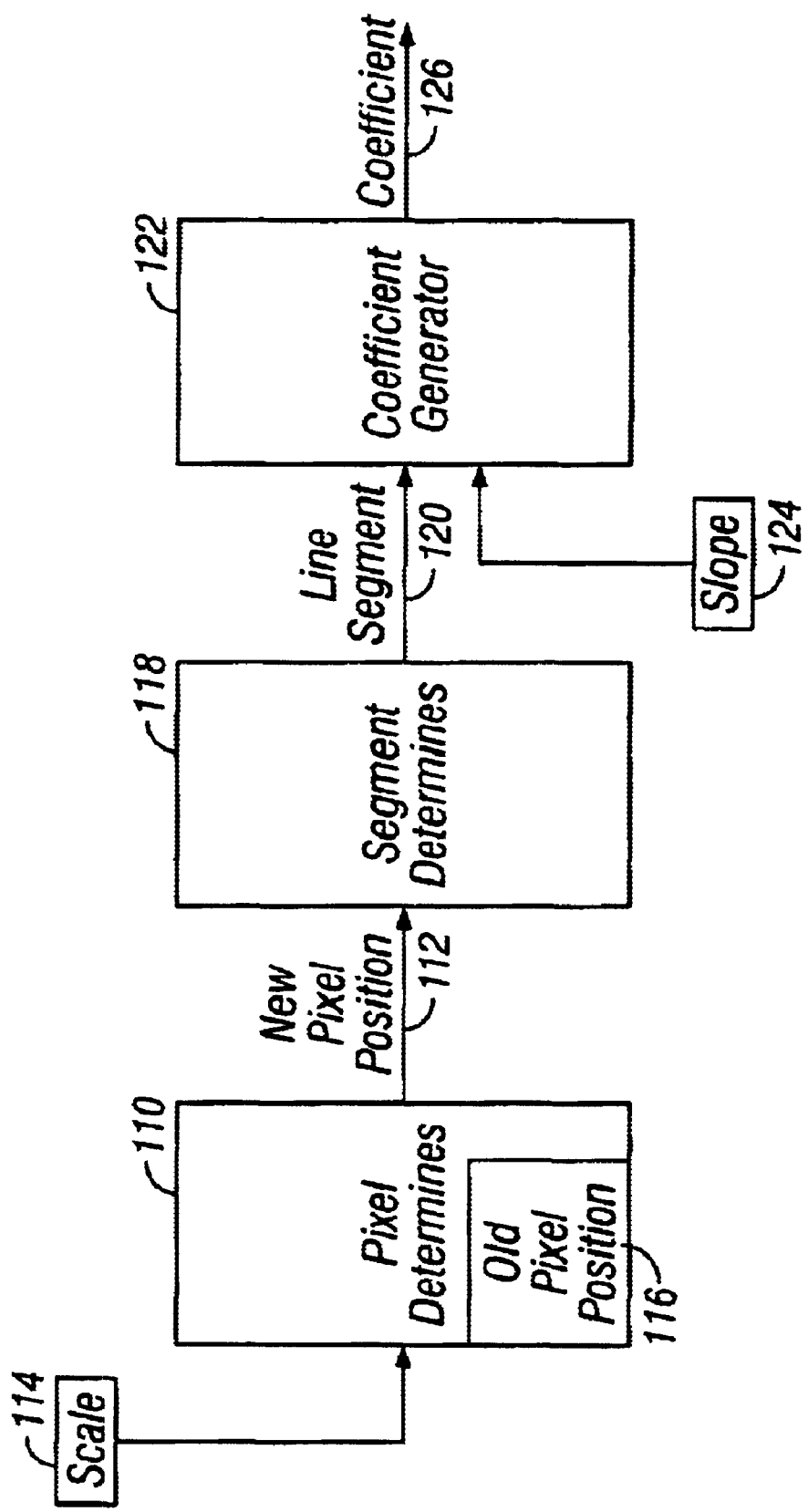
FIG. 7 is a block diagram which illustrates one embodiment of the present invention.

Turning now to FIG. 7, a block diagram of the apparatus according to one embodiment of the present invention is presented. A pixel determiner 110 computes a new pixel position 112 based upon the image scale 114 and the last pixel position 116. The pixel determiner 110 stores the new pixel position 112. A segment determiner 118 receives a pixel position 112 from the pixel determiner 110 and determines which line segment 120 is defined for the pixel position 112. A coefficient generator 122 receives a slope 124 and the line segment 120 from the segment determiner 118. The coefficient generator 122 uses the line segment 120 and the slope 124 to compute a coefficient 126. The coefficient 126 is employed in subsequent processing to interpolate a pixel intensity value for the new pixel position 112.

Figure 8:
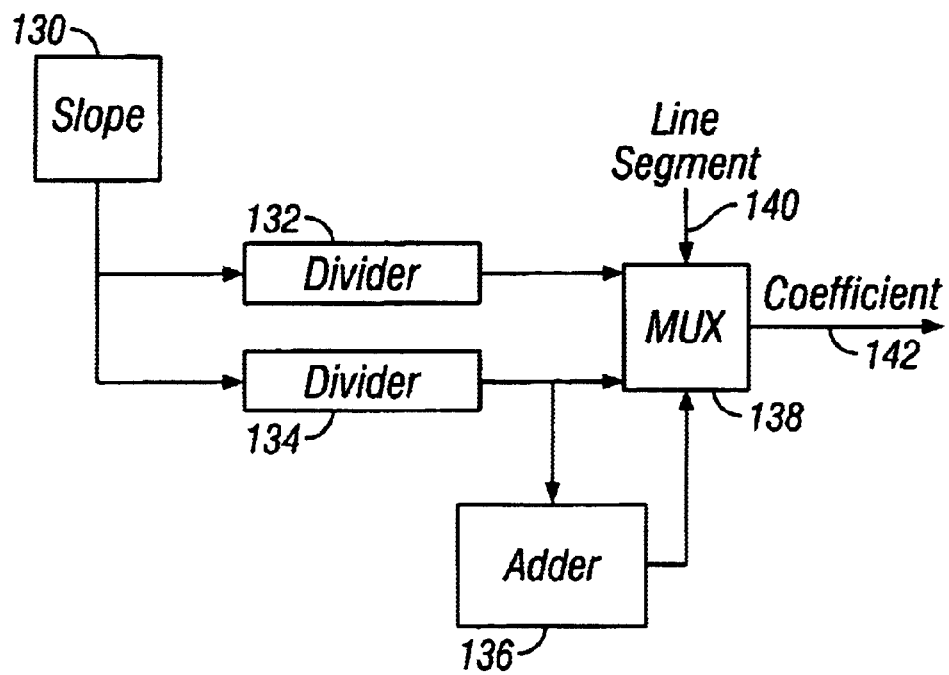
FIG. 8 is a block diagram which illustrates a coefficient generator according to one embodiment of the present invention.

Turning now to FIG. 8, a block diagram illustrating a coefficient generator 122 according to one embodiment of the present invention is presented. A slope value 130 is presented to the input of a first divider 132 and the input of a second divider 134. The output of the second divider 134 is presented to the input of an adder 136. A first multiplexer 138 accepts inputs from the outputs of the first divider 132, the second divider 134 and the adder 136. A select line 140 coupled to the line segment determines which input is selected and output as a coefficient 142. The coefficient 142 is employed in subsequent processing to interpolate a pixel intensity value for the new pixel position 112.

According to one embodiment of the present invention, the first divider 132 is a divide by two component and the second divider 134 is a divide by four component. The above description is not intended to be limiting in any way. Those of ordinary skill in the art will recognize that other coefficients may be calculated by providing more dividers and adders.

Figure 9:
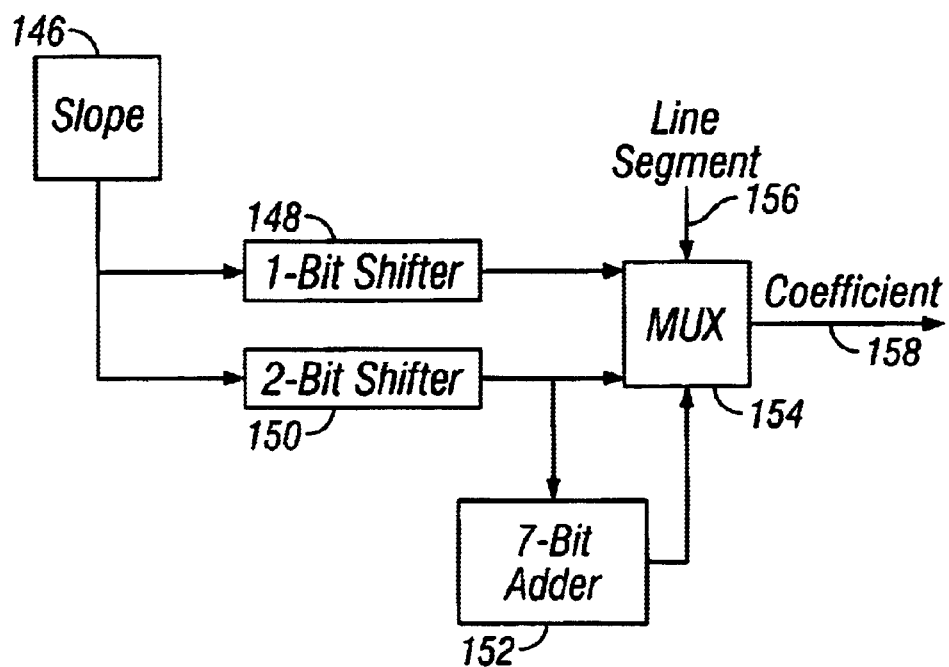
FIG. 9 is a block diagram which illustrates a coefficient generator employing shifters according to one embodiment of the present invention.

Turning now to FIG. 9, a block diagram illustrating a coefficient generator 122 employing shifters according to one embodiment of the present invention is presented. A slope value 146 is presented to the input of a one-bit shifter 148 and a two-bit shifter 150. Each shifter shifts the contents to the right by the specified number of bits. The output of the two-bit shifter 150 is presented to the input of a seven-bit adder 152. A second multiplexer 154 accepts inputs from the outputs of the one-bit shifter 148, the two-bit shifter 150 and the adder 152. A select line coupled to the line segment 156 determines which input is selected and output as a coefficient 158. The coefficient 158 is employed in subsequent processing to interpolate a pixel intensity value for the new pixel position 112.

According to one embodiment of the present invention, the adders 152 are six-bit adders, and the shifters 148, 150 hold six bits. The description of this embodiment is not intended to be limiting in any way. Those of ordinary skill in the art will recognize that adders and shifters of other sizes may be used.

Figure 10:
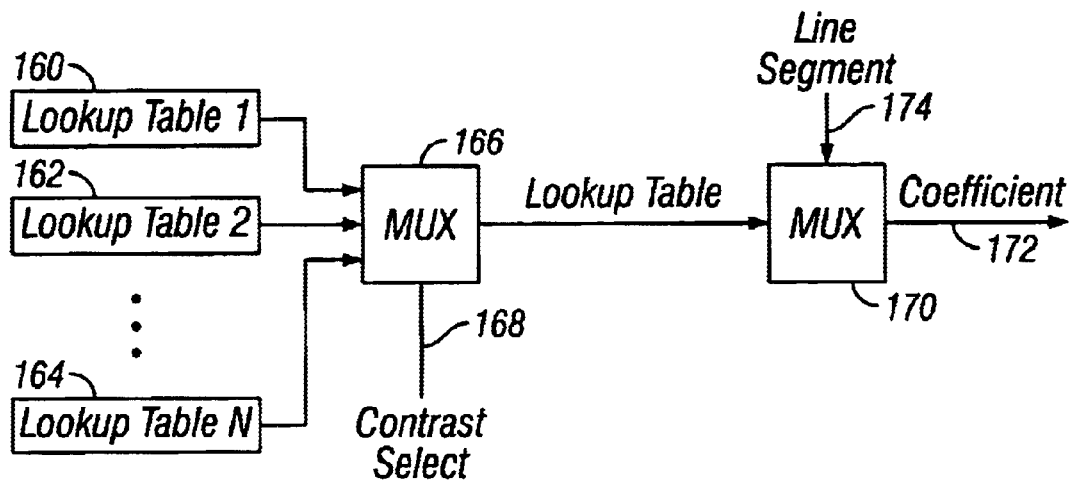
FIG. 10 is a block diagram which illustrates a coefficient generator employing lookup tables according to one embodiment of the present invention.

Turning now to FIG. 10, a block diagram illustrating a coefficient generator 122 employing lookup tables according to one embodiment of the present invention is presented. In this embodiment, the coefficients for each line segment are stored in separate lookup tables 160, 162, 164. A third multiplexer 166 selects one of the lookup tables 160, 162, 164 based upon a contrast select input 168. A lookup table 160, 162, 164 is selected to maximize contrast modulation. The coefficients of the selected lookup table are presented to the inputs of a fourth multiplexer 170. The fourth multiplexer 170 selects one of the coefficients 172 based upon the line segment 174.

According to another embodiment, the coefficients are stored in a two-dimensional array. The array is indexed by the contrast type 168 and the line segment 174.

According to another embodiment of the present invention, one register holds all the coefficients for a multi-segmented line. The coefficients are selected based on the line segment 174.

According to one embodiment of the present invention, three lookup tables 160, 162, 164 are used to store the coefficients for three multi-segmented lines. One multi-segmented line is defined to enhance deep contrast preservation. Such a line is illustrated at reference numeral 74 of FIG. 5. This line is selected to enhance images having high contrast features, such as text mode images. Another multi-segmented line is defined to enhance moderate contrast preservation. Such a line is illustrated at reference numeral 78 of FIG. 5. This line is selected where only moderate contrast preservation is required, such as graphics mode images containing lines and text. Another multi-segmented line is defined to enhance low contrast preservation. Such a line is illustrated at reference numeral 76 of FIG. 5. This line is selected for images having low frequency video, such as natural background images.

According to another embodiment of the present invention, each lookup table 160, 162, 164 comprises seven coefficients. This number of coefficients is sufficient to contain the coefficients for a seven-segment asymmetrical line, or a fourteen-segment symmetrical line.

According to another embodiment of the present invention, each of the coefficients is six bits. Those of ordinary skill in the art will recognize that coefficients of other sizes may be used.

Figure 11:
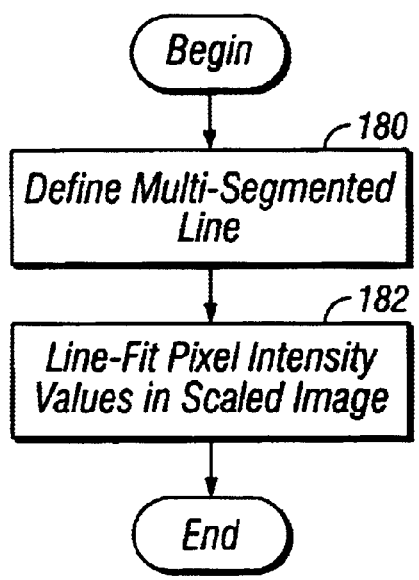
FIG. 11 is a flow diagram which illustrates image contrast modulation in accordance with the present invention.

Turning now to FIG. 11, a method for performing image contrast modulation in accordance with the present invention is presented. At reference numeral 180, a multi-segmented line is defined. At reference numeral 182, line-fitting is employed to determine the intensity values of pixels in a scaled image.

Figure 12:
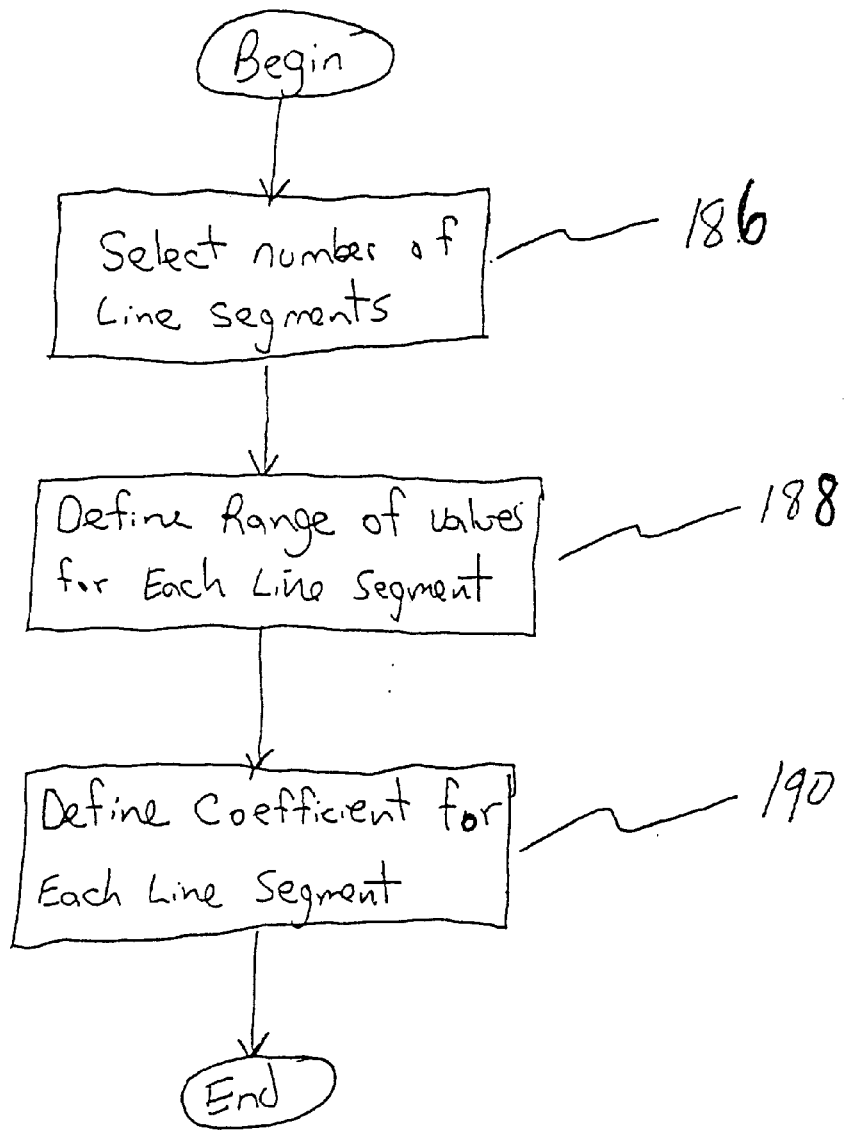
FIG. 12 is a flow diagram which illustrates the definition of multi-segmented lines in accordance with the present invention.

Turning now to FIG. 12, a detailed method for defining a multi-segmented line in accordance with reference numeral 180 is presented. At reference numeral 186, the number of line segments is selected. Typically, the number of line segments is directly related to the quality of the higher-order curve approximation. However, the amount of improvement realized for each additional line segment typically decreases as the number line segments increases. Regardless of whether the multi-segmented line is used to approximate a high order curve, increasing the number of line segments increases the flexibility to approximate any shape.

At reference numeral 188, a range of values for each line segment is defined. The range of values corresponds to the x-component for horizontal interpolation, and the y-component for vertical interpolation. At reference numeral 190, a coefficient is assigned to each line segment. The coefficient corresponds to the slope of the new segment. Those of ordinary skill in the art will recognize that many combinations of line segments are possible, both in terms of number of segments and segment slope. Additionally, the invention applies to vertical interpolation as well as horizontal interpolation.

Figure 13:
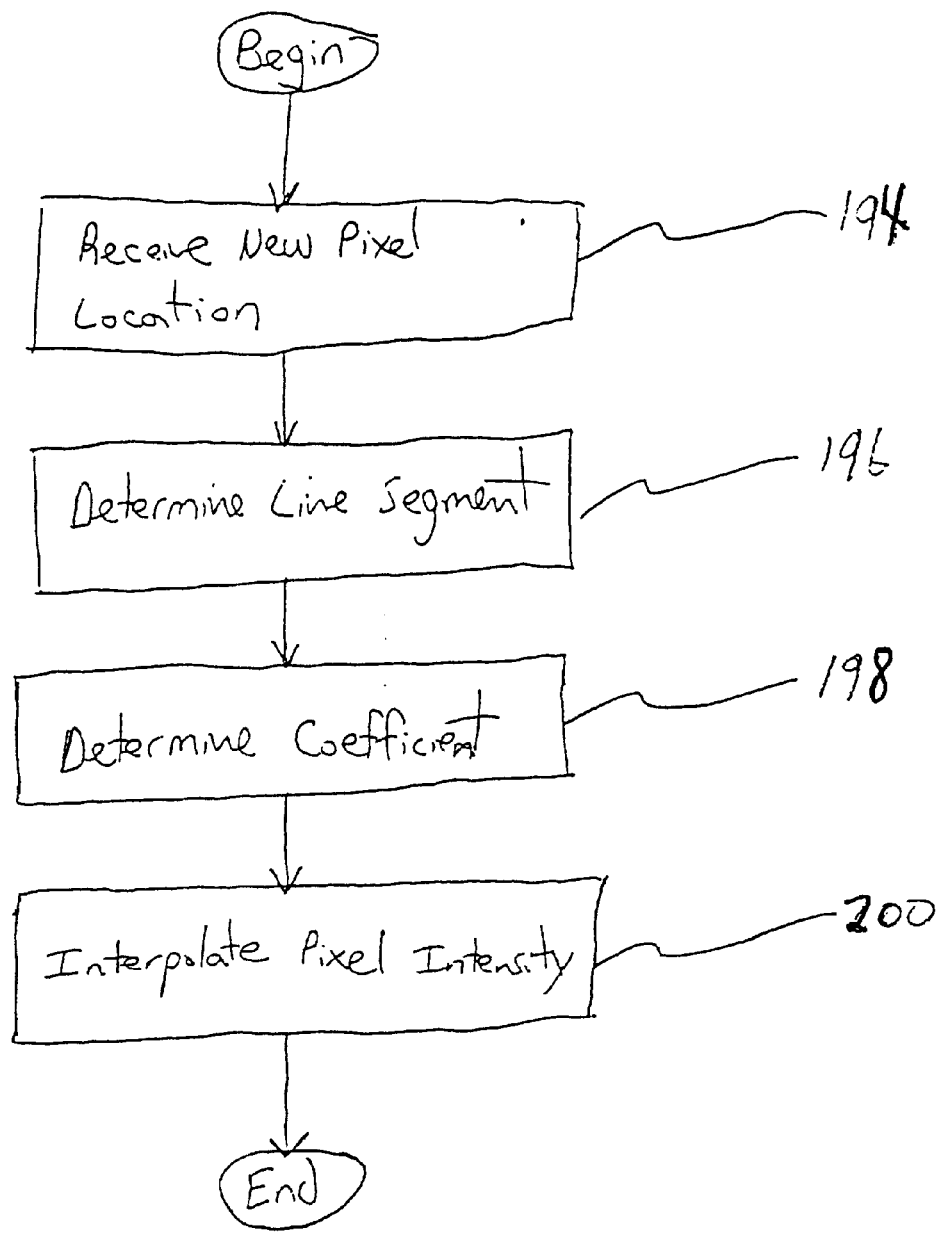
FIG. 13 is a flow diagram which illustrates line-fitting pixel intensity values in accordance with the present invention.

Turning now to FIG. 13, a detailed method for performing line-fitting in accordance with reference numeral 182 is presented. At reference numeral 194, a new pixel location is received. At reference numeral 196, the line segment defined for the pixel location is determined. At reference numeral 198, the coefficient defined for the line segment of reference numeral 196 is determined. At reference numeral 200, the coefficient from reference numeral 198 is used to interpolate an intensity value for the new pixel location.

According to one embodiment of the present invention, the multi-segmented line segment is symmetric. Those of ordinary skill in the art will recognize that the slopes for each of the line segments comprising each half of a symmetric multi-segment line are the same, thus decreasing the number of coefficients stored.

According to another embodiment of the present invention, three separate line segments are defined. One multi-segmented line is defined to enhance deep contrast preservation. Such a line is illustrated at reference numeral 74 of FIG. 5. This line is selected to enhance images having high contrast features, such as text mode images. Another multi-segmented line is defined to enhance moderate contrast preservation. Such a line is illustrated at reference numeral 78 of FIG. 5. This line is selected where only moderate contrast preservation is required, such as graphics mode images containing lines and text. Another multi-segmented line is defined to enhance low contrast preservation. Such a line is illustrated at reference numeral 76 of FIG. 5. This line is selected for images having low frequency video, such as natural background images.

Figure 14:
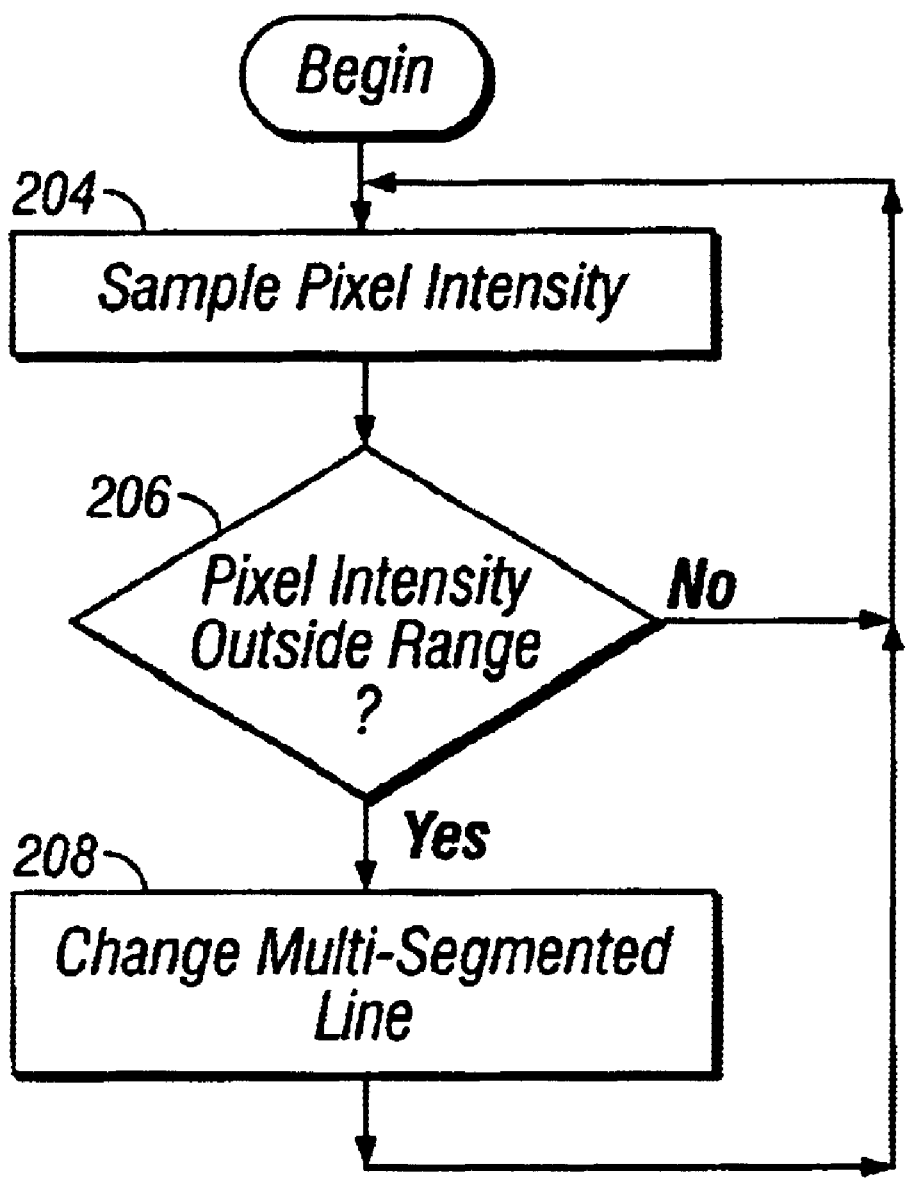
FIG. 14 is a flow diagram which illustrates real-time selection of a multi-segmented line for contrast modulation in accordance with one aspect of the present invention.

According to another embodiment of the present invention, the multi-segmented line employed to interpolate pixel intensity values is changed real-time to accommodate changing picture contents. Pixel intensity frequency is monitored real-time. This embodiment is illustrated in FIG. 14. At reference numeral 204, the pixel intensity frequency is sampled over at least one picture frame. At reference numeral 206, a check is made to determine whether the pixel intensity frequency is outside the range defined for the multi-segmented line currently in use. At reference numeral 208, if the frequency is outside the range, the current multi-segmented line is changed to a different line. If the frequency is within the defined range, execution continues at reference numeral 204.

According to a presently preferred embodiment, the present invention may be implemented in software or firmware, as well as in programmable gate array devices, Application Specific Integrated Circuits (ASICs), and other hardware.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus for image contrast modulation, comprising:

a first memory to store a scaling factor;

a second memory to store a first pixel position;

a pixel determiner coupled to said first memory and said second memory, said pixel determiner to output a second pixel position based upon said scaling factor and said first pixel position;

a segment determiner coupled to said pixel determiner, said segment determiner to output a segment signal corresponding to a line segment containing said second pixel position; and a coefficient generator coupled to said segment determiner, said coefficient generator to output a coefficient based upon said segment signal, wherein said coefficient generator comprises:

at least one divide component having an input and an output, said input of said at least one divide component coupled to said first memory; and a first multiplexer having plurality of inputs, an output and a selector, said plurality of inputs coupled to said output of said at least one divide component and said first memory.

2. The apparatus of claim 1, wherein said coefficient generator further comprises an adder, said adder including an input and an output, said input of said adder coupled to said output of said at least one divide component and said output of said adder coupled to said plurality of inputs of said first multiplexer.

3. The apparatus of claim 2, wherein said at least one divide component comprises:

a divide by two component; and a divide by four component.

4. The apparatus of claim 3, wherein said divide by two component comprises a first shifter; and said divide by four component comprises a second shifter.

5. The apparatus of claim 3, wherein said divide by two component comprises a lookup table; and said divide by four component comprises a lookup table.

6. The apparatus of claim 4, wherein said adder is a six-bit adder;

said first shifter holds six bits; and said second shifter holds six bits.

7. An apparatus for image contrast modulation, comprising:

a first memory to store a scaling factor;

a second memory to store a first pixel position;

a pixel determiner coupled to said first memory and said second memory, said pixel determiner to output a second pixel position based upon said scaling-factor and said first pixel position;

a segment determiner coupled to said pixel determiner, said segment determiner to output a segment signal corresponding to a line segment containing said second pixel position; and a coefficient generator coupled to said segment determiner, said coefficient generator to output a coefficient based upon said segment signal, wherein said coefficient generator comprises:
a plurality of lookup tables;
a first multiplexer to select one of said plurality of a lookup tables to maximize contrast preservation, said first multiplexer having a plurality of inputs, an output, and a selector, said plurality of inputs of said first multiplexer coupled to said plurality of lookup tables; and
a second multiplexer having a plurality of inputs, an output, and a selector, said plurality of inputs of said second multiplexer coupled to said output of said first multiplexer, said selector of said second multiplexer coupled to said segment selector.

8. The apparatus of claim 7, wherein said plurality of lookup tables comprises three lookup tables.

9. The apparatus of claim 7, wherein each of said plurality of lookup tables comprises seven coefficients.

10. The apparatus of claim 9, wherein each of said coefficients is six bits.

11. The apparatus of claim 7, wherein
said plurality of lookup tables comprises three lookup tables;
each of said plurality of lookup tables comprises seven coefficients; and
each of said coefficients is six bits.

12. A method for image contrast modulation, comprising:
defining at least one multi-segmented line that approximates a higher order curve including a plurality of pixels in a source image; and
line-fitting pixels in a second image according to said at least one multi-segmented line, said second image being a scaled image of said source image.

13. The method of claim 12, wherein
said defining at least one multi-segmented line comprises:
selecting a number of line segments;
defining a range of pixel locations for each line segment; and
defining a coefficient for each line segment; and
said line-fitting pixels comprises:
receiving a new pixel location;
determining which line segment is defined for said new pixel location;
determining which coefficient is defined for said line segment; and
interpolating the intensity value of the new pixel location using said coefficient.

14. The method of claim 13, wherein
said at least one multi-segmented line is symmetric; and
the number of coefficients equals one less than the number of line segments divided by two.

15. The method of claim 13, wherein
said at least one multi-segmented line comprises three multi-segmented lines; and
said defining at least one multi-segmented line further comprises:
defining one multi-segmented line for deep contrast preservation;
defining one multi-segmented line for moderate contrast preservation; and
defining one multi-segmented line for low contrast preservation.

16. The method of claim 13, further comprising:
defining a range of pixel intensity values for each multi-segmented line;
reading a sampled image pixel intensity;
determining whether said sampled image pixel intensity is within said range of pixel intensity values defined for the multi-segmented line currently being used to interpolate pixel intensity values; and
changing the multi-segmented line currently being used when said sampled image pixel intensity is not within said range of pixel intensity values defined for the multi-segmented line currently being used to interpolate pixel intensity values.

17. A computer system comprising:
a bus;
a first processor coupled to said bus;
a second processor coupled to said bus, said second processor comprising:
a video data interface for receiving video data;
an image contrast modulator coupled to said video data interface, said image contrast modulator to create coefficients for video data from said video data interface; and
an interpolator coupled to the output of said image contrast modulator, said interpolator employing said coefficients to interpolate the intensity of a pixel in a scaled image; and
a storage device coupled to said bus, said storage device to store video data sent to said second processor via said bus under the control of said first processor,
wherein said image contrast modulator comprises:
a first memory to store a scaling factor;
a second memory to store a first pixel position;
a pixel determiner coupled to said first memory and said second memory, said pixel determiner to output a second pixel position based upon said scaling factor and said first pixel position;
a segment determiner coupled to said pixel determiner, said segment determiner to output a segment signal corresponding to a line segment containing said second pixel position; and
a coefficient generator coupled to said segment determiner, said coefficient generator to output a coefficient based upon said segment signal.

18. The computer system of claim 17, wherein said coefficient generator further comprises:
at least one divide component, having an input and an output, said input of said at least one divide component coupled to said first memory; and
a first multiplexer having plurality of inputs, an output and a selector, said plurality of inputs coupled to said output of said at least one divide component and said first memory.

19. The computer system of claim 18, wherein said coefficient generator further comprises an adder, said adder including-an input and an output, said input of said adder coupled to said output of said at least one divide component and said output of said adder coupled to said plurality of inputs of said first multiplexer.

20. The computer system of claim 19, wherein said at least one divide component comprises:
a divide by two component; and
a divide by four component.

21. The computer system of claim 20, wherein
said divide by two component comprises a first shifter; and
said divide by four component comprises a second shifter.

22. The computer system of claim 20, wherein said divide by two component comprises a lookup table; and said divide by four component comprises a lookup table.

23. The computer system of claim 17, wherein said coefficient generator further comprises:

a plurality of lookup tables;

a first multiplexer to select one of said plurality of a lookup tables to maximize contrast preservation, said first multiplexer having a plurality of inputs, an output, and a selector, said plurality of inputs of first multiplexer coupled to said plurality of lookup tables; and a second multiplexer having a plurality of inputs, an output, and a selector, said plurality of inputs of said second multiplexer coupled to said output of said first multiplexer, said selector of said second multiplexer coupled to said segment selector.

24. The computer system of claim 23, wherein said plurality of lookup tables comprises three lookup tables;

each of said plurality of lookup tables comprises seven coefficients; and each of said coefficients is six bits.

25. A program storage device readable by a machine, tangibly embodying a program of instructions executable by the machine to modulate image contrast, comprising:

a first module comprising code for causing a machine to define at least one multi-segmented line that approximates a high order curve including a plurality of pixels in a source image; and a second module comprising code for causing a machine to line-fit pixels in a second image according to said at least one multi-segmented line, said second image being a scaled image of said source image.

26. The program storage device of claim 25, wherein said defining at least one multi-segmented line comprises:

a third module comprising code for causing a machine to select a number of line segments;

a fourth module comprising code for causing a machine to define a range of pixel locations for each line segment; and a fifth module comprising code for causing a machine to defining a coefficient for each line segment; and said line-fitting pixels comprises:

a sixth module comprising code for causing a machine to receive a new pixel location;

a seventh module comprising code for causing a machine to determine which line segment is defined for said new pixel location;

an eighth module comprising code for causing a machine to determine which coefficient is defined for said line segment; and a ninth module comprising code for causing a machine to interpolate the intensity value of the new pixel location using said coefficient.

27. The program storage device of claim 26, wherein said multi-segmented line comprises sixteen segments.

28. The program storage device of claim 26, wherein said at least one multi-segmented line is symmetric; and the number of coefficients equals one less than the number of line segments divided by two.

29. The program storage device of claim 26, wherein said at least one multi-segmented line comprises three multi-segmented lines; and said defining at least one multi-segmented line further comprises:

a tenth module comprising code for causing a machine to define one multi-segmented line for deep contrast preservation;

an eleventh module comprising code for causing a machine to define one multi-segmented line for moderate contrast preservation; and a twelfth module comprising code for causing a machine to define one multi-segmented line for low contrast preservation.

30. The program storage device of claim 26, further comprising:

a tenth module comprising code for causing a machine to define a range of pixel intensity values for each multi-segmented line;

an eleventh module comprising code for causing a machine to read a sampled image pixel intensity;

a twelfth module comprising code for causing a machine to determine whether said sampled image pixel intensity is within said range of pixel intensity values defined for the multi-segmented line currently being used to interpolate pixel intensity values; and a thirteenth module comprising code for causing a machine to change the multi-segmented line currently being used when said sampled image pixel intensity is not within said range of pixel intensity values defined for the multi-segmented line currently being used to interpolate pixel intensity values.

31. An apparatus for image contrast modulation, comprising:

means for defining at least one multi-segmented line that approximates a higher order curve including a plurality of pixels in a source image; and means for line-fitting pixels in a second image according to said at least one multi-segmented line, said second image being a scaled image of said source image.

32. The apparatus as defined in claim 31, wherein:

said means for defining at least one multi-segmented line comprises:

means for selecting a number of line segments;

means for defining a range of pixel locations for each line segment; and means for defining a coefficient for each line segment; and said means for line-fitting pixels comprises:

means for receiving a new pixel location;

means for determining which line segment is defined for said new pixel location;

means for determining which coefficient is defined for said line segment; and means for interpolating the intensity value of the new pixel location using said coefficient.

33. The apparatus as defined in claim 32, wherein:

said at least one multi-segmented line is symmetric; and the number of coefficients equals one less than the number of line segments divided by two.

34. The apparatus as defined in claim 32, wherein:

said at least one multi-segmented line comprises three multi-segmented lines; and said defining at least one multi-segmented line further comprises:

means for defining one multi-segmented line for deep contrast preservation;

means for defining one multi-segmented line for moderate contrast preservation; and means for defining one multi-segmented line for low contrast preservation.

35. The apparatus as defined in claim 32, further comprising:

means for defining a range of pixel intensity values for each multi-segmented line;

means for reading a sampled image pixel intensity;

means for determining whether said sampled image pixel intensity is within said range of pixel intensity values defined for the multi-segmented line currently being used to interpolate pixel intensity values; and means for changing the multi-segmented line currently being used when said sampled image pixel intensity is not within said range of pixel intensity values defined for the multi-segmented line currently being used to interpolate pixel intensity values.

36. The computer system of claim 17, wherein said coefficient generator further comprises:

at least one shifter component having an input and an output, said input of said at least one shifter component coupled to said first memory; and a multiplexer having a plurality of inputs, an output and a selector, said plurality of inputs coupled to said output of said at least one shifter component and to said first memory.

37. The computer system of claim 36, wherein said coefficient generator further comprises an adder having an input and an output, said input of said adder coupled to said output of said at least one shifter component and said output of said adder coupled to said plurality of inputs of said multiplexer.

38. The apparatus of claim 37, wherein said at least one shifter component comprises:

a one-bit shifter component; and a two-bit shifter component.

* * * * *

UNITED STATES PATENT AND TRADEMARK OFFICE
CERTIFICATE OF CORRECTION

PATENT NO. : 6,633,687 B1
DATED : October 14, 2003
INVENTOR(S) : Ying Cui

It is certified that error appears in the above-identified patent and that said Letters Patent is hereby corrected as shown below:

<u>Column 3,</u>
Line 58, replace "$I_n=(F_n*P_n)+(F_{n+1}*P_{n+1})(F_n+F_{n+1}=^1)$" with
-- $I_n = (F_n * P_n) + (F_{n+1} * P_{n+1})$    $(F_n + F_{n+1}=1)$ --.

Signed and Sealed this

Twenty-fourth Day of February, 2004

JON W. DUDAS
*Acting Director of the United States Patent and Trademark Office*